(12) United States Patent
Harig et al.

(10) Patent No.: US 9,086,319 B2
(45) Date of Patent: Jul. 21, 2015

(54) RECORDING A SPECTRALLY RESOLVED IMAGE BY READING OUT SEVERAL PARTIAL ARRAYS IN A PLURALITY OF INTERFEROMETER SCANS

(71) Applicant: Bruker Optik GmbH, Ettlingen (DE)

(72) Inventors: Roland Harig, Waldbronn (DE); Joern-Hinnrich Gerhard, Waldbronn (DE)

(73) Assignee: Bruker Optik GmbH, Ettlingen (DE)

( * ) Notice: Subject to any disclaimer, the term of this patent is extended or adjusted under 35 U.S.C. 154(b) by 189 days.

(21) Appl. No.: 13/672,728

(22) Filed: Nov. 9, 2012

(65) Prior Publication Data

US 2013/0120755 A1 May 16, 2013

(30) Foreign Application Priority Data

Nov. 11, 2011 (DE) .......................... 10 2011 086 226

(51) Int. Cl.
| | | |
|---|---|---|
| *G01J 3/45* | (2006.01) | |
| *G01J 3/28* | (2006.01) | |
| *G01B 11/24* | (2006.01) | |
| *G01B 9/02* | (2006.01) | |
| *G01J 3/453* | (2006.01) | |

(52) U.S. Cl.
CPC ............ *G01J 3/2823* (2013.01); *G01B 9/02044* (2013.01); *G01B 9/02076* (2013.01); *G01B 11/2441* (2013.01); *G01J 3/2803* (2013.01); *G01J 3/45* (2013.01); *G01J 3/453* (2013.01); *G01J 3/4535* (2013.01)

(58) Field of Classification Search
CPC ............ G01J 3/4535; G01J 3/453; G01J 3/45; G01J 3/2803; G01J 3/2823; G01N 2021/3595; G01N 2021/5965; G01B 9/02044; G01B 9/02076; G01B 11/2441
USPC ................. 356/451, 452, 455, 456; 250/208.1
See application file for complete search history.

(56) References Cited

U.S. PATENT DOCUMENTS

| | | | | |
|---|---|---|---|---|
| 4,480,914 A * | 11/1984 | Thompson et al. | ............ | 356/452 |
| 5,146,073 A * | 9/1992 | Wirth et al. | ................. | 250/201.9 |
| 5,539,518 A * | 7/1996 | Bennett | ........................ | 356/452 |
| 5,835,214 A * | 11/1998 | Cabib et al. | .................... | 356/452 |
| 7,283,231 B2 * | 10/2007 | Brady et al. | .................... | 356/326 |
| 7,411,682 B2 * | 8/2008 | Moshe | .......................... | 356/452 |
| 7,427,932 B2 * | 9/2008 | Brady et al. | .................... | 341/13 |
| 2003/0067606 A1 | 4/2003 | Simon | | |
| 2003/0146386 A1 * | 8/2003 | Nagoshi et al. | .......... | 250/339.08 |

(Continued)

*Primary Examiner* — Michael A Lyons
*Assistant Examiner* — Violeta A Prieto
(74) *Attorney, Agent, or Firm* — Paul Vincent (57) ABSTRACT

A method for the acquisition (AU) of a spectrally resolved, two-dimensional image by means of Fourier transform (FT) spectroscopy or Fourier transform infrared (FTIR) spectroscopy, is characterized in that, during multiple passes (D1-D4) of an optical path difference (OG) between two partial rays (14a, 14b) over an identical range (IB), different subsets of detector elements (22) of an array detector (5) are read out and the signals of the read-out detector elements (22) of the multiple passes (D1-D4) are Fourier transformed and combined to form the spectrally resolved image. A method is thereby provided for the acquisition of two-dimensional, spectrally resolved images, in which the influence of vibrations on the measurement is reduced, and which is less affected by the movement of objects to the resolved spectrally.

15 Claims, 6 Drawing Sheets

(56) References Cited

U.S. PATENT DOCUMENTS

| | | |
|---|---|---|
| 2004/0041939 A1* | 3/2004 | Hofer et al. ............... 348/362 |
| 2004/0114211 A1* | 6/2004 | Trepagnier et al. ......... 359/328 |
| 2005/0135549 A1* | 6/2005 | Hagiwara .................. 378/4 |
| 2005/0236554 A1* | 10/2005 | Fontaine et al. ........... 250/208.1 |
| 2010/0165338 A1* | 7/2010 | Claps ....................... 356/317 |
| 2010/0265320 A1* | 10/2010 | Treado et al. ............... 348/61 |
| 2010/0284017 A1* | 11/2010 | Reyes et al. ................ 356/452 |
| 2011/0181891 A1* | 7/2011 | Hwang et al. ............... 356/511 |

* cited by examiner

Fig. 5

RECORDING A SPECTRALLY RESOLVED IMAGE BY READING OUT SEVERAL PARTIAL ARRAYS IN A PLURALITY OF INTERFEROMETER SCANS

This application claims Paris convention priority of DE 10 2011 086 226.9 filed on Nov. 11, 2011 the entire disclosure of which is hereby incorporated by reference.

BACKGROUND OF THE INVENTION

The invention relates to a method for the acquisition of a spectrally resolved two-dimensional image by means of Fourier transform (FT) spectroscopy, in particular Fourier transform infrared (FTIR) spectroscopy, wherein light is fed to an interferometer and split into two partial beams, wherein the optical path difference between the two partial beams is changed and traverses an identical range several times, and wherein the light is detected by a two-dimensional array detector.

Such a method is known from DE 101 44 214 C1.

In Fourier transform (FT) spectroscopy, light is split into two partial beams, a path difference between the partial beams is impressed, and a detector on which the superimposed partial beams fall is read out. Manipulation of the partial beams is effected in an interferometer, typically with a semi-transparent beam splitter and one or two moving reflectors. Read-out of the detector is repeated for different path differences (repeated read-out at what are known as "scan points").

Superimposing the partial beams causes interference which, depending on the path difference and on the frequency of the light, can lead to destruction of or high irradiation intensities on the detector. The intensity data of the detector dependent on the path difference is subjected to a Fourier transform, whereby the spectrum of the light is maintained.

FT spectroscopy can be carried out with two-dimensional spatial resolution. In this case, the light of a scene (which is illuminated by way of an interferometer or which emits light into an interferometer) is typically imaged onto a two-dimensional array detector. For each detector element of the array detector the spectrum of the light impinging thereon can be determined by Fourier transform, whereby a spectrally resolved, two-dimensional image is obtained.

For acquiring a single, spectrally resolved image, the optical path difference is usually continuously altered, whilst the detector is read out repeatedly (known as "rapid scan"). For that purpose, a moving reflector of the interferometer is moved by a motor at a constant speed.

Whereas the exposure time of the detector for a scan point is relatively short (typically around 100 µs), read-out and further processing of the data of the individual detector elements requires a considerable time (typically of the order of a millisecond), resulting in a minimum time interval for reading out scan points. When the scan points, which are successive with respect to the optical path difference, are to be read out in succession, the speed at which the reflector can be moved is accordingly limited, or more generally the speed at which the optical path difference can be changed is limited.

In practice, it has been shown that an interferometer cannot be protected entirely against vibrations. These vibrations falsify the actual path difference, impair the spectral resolution of the image acquisition (interferograms "spread" in the time domain) and make the control of the optical path difference (mirror movement) difficult. The vibrations become noticeable above all at a low speed of the change in the path difference, so that a high speed of the change in the path difference is invariably to be preferred.

DE 101 44 214 C1 proposed measuring the scan points needed for an acquisition of a spectrally resolved, two-dimensional image distributed over multiple passes of the optical path difference. In each pass, only some of the scan points needed are read out, wherein in each case one or more scan points in respect of the sequence of the optical path difference are skipped.

This procedure enables the speed of the change in the optical path difference to be kept high in the individual passes, and a good spectral resolution can be achieved. Nevertheless, in this procedure a relatively large amount of time can elapse between the reading out of scan points that follow one another in respect of the optical path difference, since they are measured in different passes. In this period the scene, the spectrally resolved image of which is being acquired, can change noticeably; in particular, objects to be resolved spectrally may move. As a result, during the acquisition of the individual interferograms the detector elements each receive radiation of different objects or object parts, whereby often (if the object movements are too strong) overall it is impossible to obtain any meaningful spectral information.

It is also known to acquire two-dimensional, spectrally resolved images with a single-element detector, wherein the field of view of the system is changed by means of a mirror system after acquiring an interferogram, in order in this manner to scan the image ("scanning spectrometer").

The invention addresses the problem of providing a method for the acquisition of two-dimensional, spectrally resolved images in which the influence of vibrations on the measurement is reduced, and which is less affected by the movement of objects to be resolved spectrally.

SUMMARY OF THE INVENTION

That problem is solved by a method of the kind mentioned initially, which is characterized in that during the multiple passes of the optical path difference between the two partial rays over the identical range different subsets of detector elements of the array detector are read out, and in that the signals of the read-out detector elements of the multiple passes are Fourier transformed and combined to form the spectrally resolved image.

The path difference is changed according to the invention in the multiple passes typically in each case continuously over the identical range (rapid scan). Within a pass (sweep), at different predefined path differences (usually correspondingly determined locations of a moving reflector along a distance covered) or times the subset of detector elements selected for this pass is read out (read-out at the scan points).

The time required to read out a scan point (including data processing) is shortened by the invention by reducing the detector elements (compared with the array as a whole) read out per scan point; the speed of the change in the path difference (usually corresponding to a substantially constant movement speed of a moving reflector) can then be selected to be correspondingly higher than when reading out the array as a whole at each scan point, when read-out is to be at the same path differences within the identical range. This increased speed upon the change in the path difference reduces the influence of vibrations, which to a certain extent are unavoidable.

According to the invention the length of time for reading out a scan point is typically around 0.1 ms to 2.5 ms (corresponding to a sample rate of 400 Hz and 10 Hz). For a single pass of the identical range, according to the invention typically about 100 ms to 2000 ms are needed, depending on the selected spectral resolution and the fold limit.

Once all path differences provided for the selected subset or for the associated detector elements have been measured (typically in a single pass), complete interferograms can be determined from the read-out signals for each individual detector element of the selected subset; the measurement of other detector elements (in other subsets) is not required for this and there is no need to wait for the same (nonetheless, it is possible to wait until all passes are concluded and all detector elements have been read out before the Fourier transform is carried out).

The data necessary for the interferograms of the individual detector elements (pixels) is read out completely within a relatively short time (typically within a fraction of the duration of the acquisition of the entire image, with the fraction corresponding to the proportion of detector elements of a subset of all detector elements of the array detector), so that object movements are comparatively less damaging for the individual spectrums.

In the context of the invention, 400 ms to 30 s are typically required for an acquisition of an entire image, that is, for all passes.

A subset read out in a pass comprises typically between ½ and 1/64 of all detector elements of the array detector (detector elements not belonging to this subset are not read out in this pass). A subset basically comprises multiple detector elements, preferably at least 256 detector elements (for instance in a 16×16 arrangement), and more particularly at least 4096 detector elements (for instance in a 64×64 arrangement). The array detector comprises in total preferably at least 1024, more particularly at last 4096, most preferably at least 16,384 detector elements; for example, 128×128 or 256×256 detector elements can be used. Generally speaking, square arrangements of the detector elements are preferred for the array detector and/or the subsets; but other arrangements (for instance rectangular or arrangements adapted to the scene/sample to be observed) can also be used. During the multiple passes, the array detector remains stationary relative to the imaging of the scene/sample being examined (stationary field of view of the array detector).

In a preferred variant of the method according to the invention, the subsets each form a respective cohesive, in particular rectangular, sub-array of detector elements of the array detector. In this case partial images that exhibit relatively little blurring, even in the case of object movements, are obtained for the sub-arrays; the partial images may not fit together in time exactly, but the quality of each partial image is good. Alternatively, the detector elements of the sub-array can be distributed uniformly over the array as a whole.

A further development of the above variant, in which the spectrally resolved image is combined from signals from non-overlapping sub-arrays of detector elements of the array detector, is preferred. If the sub-arrays do not overlap, superfluous multiple read-outs of detector elements in different passes are avoided, thereby saving acquisition time.

Especially preferred is a variant of the method which provides for the optical path difference to be changed by means of one or more moving reflectors, and the or each moving reflector to be moved within the multiple passes over an identical distance. The adjustment of the optical path difference by way of a moving reflector is especially simple. Alternatively, the optical path difference can also be effected, for example, by inserting elements having a high refractive index, for instance prisms, into the beam path of a partial beam; a person skilled in the art will be familiar with further options.

In an advantageous variant of the method, in successive passes the path difference (OG) change is effected with the opposite sign. If the path difference is changed by means of a moving reflector, the successive passes occur over the identical distance in the opposite direction of movement. In this variant, after one pass, without resetting the device to change the optical path difference (for instance without resetting a moving reflector), the next pass can be commenced.

A method variant is especially preferred in which the spectrally resolved image is acquired from a scene which does not change noticeably over the duration of one pass, yet does change noticeably over the duration of all passes of the acquisition. In this case, a good quality image can still be acquired with the method according to the invention, whereas noticeable interference occurs in the prior art according to DE 101 44 214 C1. In this variant, objects of the scene (which are to be spectrally resolved) typically move during a pass by less than one pixel in the detector plane, but for the duration of all passes move by more than one pixel in the detector plane. In this variant, all predefined path differences (typically locations along the distance covered by a moving reflector) for an interferogram are read out during a single pass.

Also preferred is a variant in which the spectrally resolved image is combined from the signals of at least two subsets of the detector elements from at least two passes and the union of the said at least two subsets does not correspond to the quantity of all existing detector elements of the array detector. The acquisition time can thereby be shortened; image portions that are not relevant are not read out at the detector.

A variant in which the method is used for remote sensing is especially preferred. In remote sensing, toxic substances, for example, can be clearly identified from a safe distance, for example, when the substance is escaping from a leak in a tank or a pipe. A scene is in this case typically imaged onto the array detector by the interferometer. Alternatively, near samples can also be examined with the method according to the invention, in which case the sample is preferably arranged between the interferometer and the detector; alternatively the sample can be imaged onto the detector by the interferometer.

In an advantageous variant, for each of the subsets the signals of the detector elements of the subset are read out in two or more passes of the optical path difference, wherein in the two or more passes the read-out is effected at different optical path differences. The speed of the change in the path difference can therefore be further increased, with the result that the influence of vibrations is further limited.

A method variant is also advantageous in which for each of the subsets the signals of the detector elements of the subset are read out in two or more passes of the optical path difference, wherein an averaging, summation or median calculation of signals that are measured in the two or more passes, in each case at identical optical path difference, is carried out. The signal-to-noise ratio can be improved by the multiple read-out of signals (of the same pixel) at identical path differences (i.e. at the identical scan point) and by the combination thereof for evaluation.

Alternatively, each subset can be read out in just one pass of the optical path difference.

The invention also relates to a Fourier transform (Fr) spectrometer, in particular a FTIR spectrometer, comprising
    an interferometer having a device for changing the optical path difference, with which an optical path difference between two partial beams of the light supplied to the interferometer can be changed, a two-dimensional array detector, and an electronic control unit, with which the device for changing the optical path difference can be controlled, so that the optical path difference is known and with which the reading out of detector elements of the array detector can be controlled, wherein the electronic control unit is programmed for the acquisition of an individual, spectrally resolved, two-dimensional image by means of the device for changing the optical path to traverse an identical range of the optical path difference several times, said spectrometer being characterized in that the electronic control unit is furthermore programmed during the multiple passes of the optical path difference between the two partial beams over the identical range to read out different subsets of detector elements of the array detector, and in that the FT spectrometer comprises a computing unit with which the signals of the read-out detector elements of the multiple passes can be subjected to a Fourier transform and can be combined to form the spectrally resolved image. Using the inventive FT spectrometer, the above-described method according to the invention (of variants thereof) can be carried out automatically. The FT spectrometer can change the path difference at relatively high speed, so that it is relatively insensitive to vibrations. The signals for interferograms of individual detector elements are acquired in a relatively short time, so that object movements in a recorded scene cause little interference.

In an advantageous embodiment of the FT spectrometer according to the invention, the computing unit is integrated in the electronic control unit. The spectrally resolved, two-dimensional image can thus be generated with the FT spectrometer itself.

In an alternative embodiment, the computing unit is separate from the electronic control unit. In particular a PC or other computer can be used as computing unit. In this case the image generated can be more easily further processed or used.

An embodiment in which the device for changing the optical path difference comprises a reflector moved by motor is especially preferred. The setting of the optical path difference is thereby especially easy, and the movement of the reflector can also take place with comparatively few vibrations. Alternatively, a wedge-shaped, refractive element (prism) can be used, which is inserted to different lengths into the beam path of a partial beam to change the path difference.

An advantageous embodiment provides for the electronic control unit, for the acquisition of the spectrally resolved image, to be programmed to read out each subset of detector elements in two or more passes of the optical path difference, wherein in the two or more passes read-out is effected at different optical path differences. An especially high speed of the change in the optical path difference can thus be set, whereby the susceptibility to vibrations is further reduced.

Another advantageous embodiment provides for the electronic control unit, for the acquisition of the spectrally resolved image, to be programmed to read out each subset in two or more passes of the optical path difference, wherein an averaging, summation or median calculation of signals that are measured in the two or more passes, in each case at identical optical path difference, is carried out. The signal-to-noise ratio can be improved by the multiple read-out of signals (of the same pixel) at identical path differences (i.e. at the identical scan point) and by the combination thereof for evaluation.

Further advantages of the invention will be apparent from the description and the drawings. The features mentioned above and hereafter may also be used according to the invention alone or jointly in any combination. The embodiments illustrated and described are not to be understood as an exhaustive list, but are merely of an exemplary nature for explanation of the invention.

The invention is illustrated in the drawings and is explained by means of exemplary embodiments. In the drawings.

BRIEF DESCRIPTION OF THE DRAWING

DESCRIPTION OF THE PREFERRED EMBODIMENT

Figure 1:
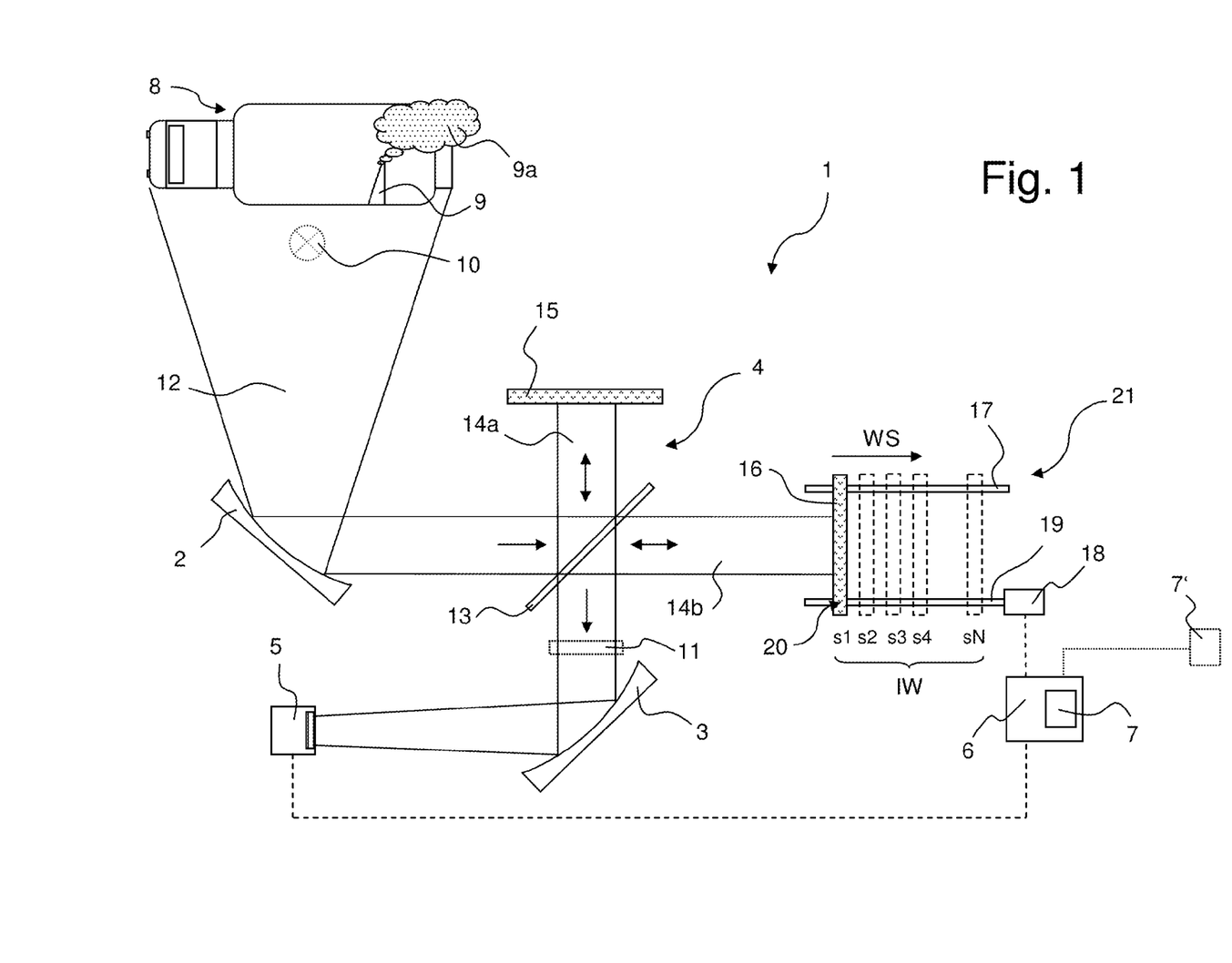
FIG. 1 shows a schematic overview of an FT spectrometer according to the invention.

FIG. 1 illustrates by way of example in a schematic view a Fourier transform (Fr) spectrometer or a Fourier transform infrared (FTIR) spectrometer.

The FTIR spectrometer 1 comprises imaging optics, here with two mirrors 2, 3 (other optics can be provided, for instance with just one mirror 3, or with lenses or a combination of mirrors and lenses), an interferometer 4, a two-dimensional array detector and an electronic control unit 6, in which a computing unit 7 is integrated (alternatively a separate computing unit 7' can be provided).

The FTIR spectrometer 1 is used here for remote sensing. A scene 8, which shows a tanker lorry with a damaged tank, see damage 9, is imaged via the mirror 2 by the interferometer 4 onto the array detector 5. The two-dimensional spectrally resolved image to be generated can establish whether the tank contents (for instance vapors) are already escaping in the region of the damage 9; a spreading vapor cloud 9a represents by way of example a moving object of the scene 8 to be spectrally resolved. The escaping tank contents can be identified using characteristic IR spectral lines by means. (Alternatively in the context of the invention the scene 8 can be replaced by an infrared source 10 and a sample or a surface 11 to be examined is arranged in the beam path downstream of the interferometer 4, so that the sample or surface 11 to be examined is transilluminated by the interferometer and imaged onto the array detector 5; see in this connection the dotted light source 10 and the dotted sample 11 for a measurement in transmission; for a measurement in reflection the detector 5 would have to be directed towards the face of the sample or sample surface 11 facing the interferometer 4.)

By means of the mirror 2, in the embodiment shown the light coming from the scene 8 is fed to the interferometer 4. In the interferometer 4 the light 12 is split by means of a beam splitter plate 13 into two partial beams 14a and 14b. The first partial beam 14a (this the proportion of light 12 reflected at the beam splitter plate 13) is reflected by a stationary reflector 15, passes through the beam splitter plate 13 and leaves the interferometer 4 in the direction of the mirror 3. The second partial beam 14b (this is the proportion of light 12 transmitted at the beam splitter plate 13) is reflected by a moving reflector 16 and diverted at the beam splitter plate 13, so that it leaves the interferometer 4 likewise in the direction of the mirror 3. Finally, the mirror 3 images the scene 8 onto the array detector 5.

At the array detector 5 the overlap of the partial beams 14a, 14b is measured, wherein depending on the frequency of the light 12 (or the frequency components thereof) and depending on the path difference between the two partial beams 14a, 14b, the partial beams 14a, 14b cause interference.

To acquire a spectrally resolved image of the scene 8, the moving reflector 16 is moved several times over an identical distance IW. The reflector 16 is in this connection driven by means of an electric motor 18 via a threaded rod 19, which is guided in an internally threaded bore 20 of the reflector 16; the reflector 16 is additionally guided by a rail 17 running parallel to the threaded rod 19. Movement of the reflector 16 changes the optical path difference between the partial beams 14a, 14b, wherein the change in the optical path difference corresponds to twice the distance WS covered by the reflector 16, since the second partial beam 14b traverses the distance WS there and back. The moving reflector 16 (including gears and motor system) is used here as a device 21 for changing the optical path difference between the two partial beams 14a, 14b, and the identical distance IW corresponds to an identical range IB of the optical path difference, over which a change takes place, during the repeated movement of the reflector 16. Within the scope of the invention first of all a first subset of the array detector 5 is selected, which in one pass (sweep) of the moving reflector 16 over the identical distance IW is to be read out at different predefined scan points s1 . . . sN. The reflector 16 is moved by means of the motor 18 at uniform speed (for instance from left to right), and each time a predetermined travel position is reached, corresponding to one of the scan points s1 . . . sN, the first sub-array of the array detector 5 is read out. When the first sub-array has been read out at all the scan points s1 . . . sN provided, the pass ends.

Subsequently, a second sub-array of the array detector 5 is selected, and in a further pass of the moving reflector 16 over the identical distance IW this second sub-array is read out at the scan points s1 . . . sN. This is followed by further passes for all the further sub-arrays provided.

The motor 18 is controlled by the electronic control unit 6, which also determines the times at which a sub-array of the array detector 5 is read out. The electronic control device 6 also determines which detector elements of the array detector 5 belong to which sub-array. The signals that have been read out during a particular pass for a particular detector element can be subjected by means of the computing unit 7, which is here integrated in the control unit 6, to a Fourier transform, so that a spectrum (that is, frequency-dependent intensity information) is obtained for this detector element.

The spectrums of all detector elements read out in the course of the acquisition produce the two-dimensional, spectrally resolved image; this is preferably put together in the integrated computing unit 7.

Figure 2:
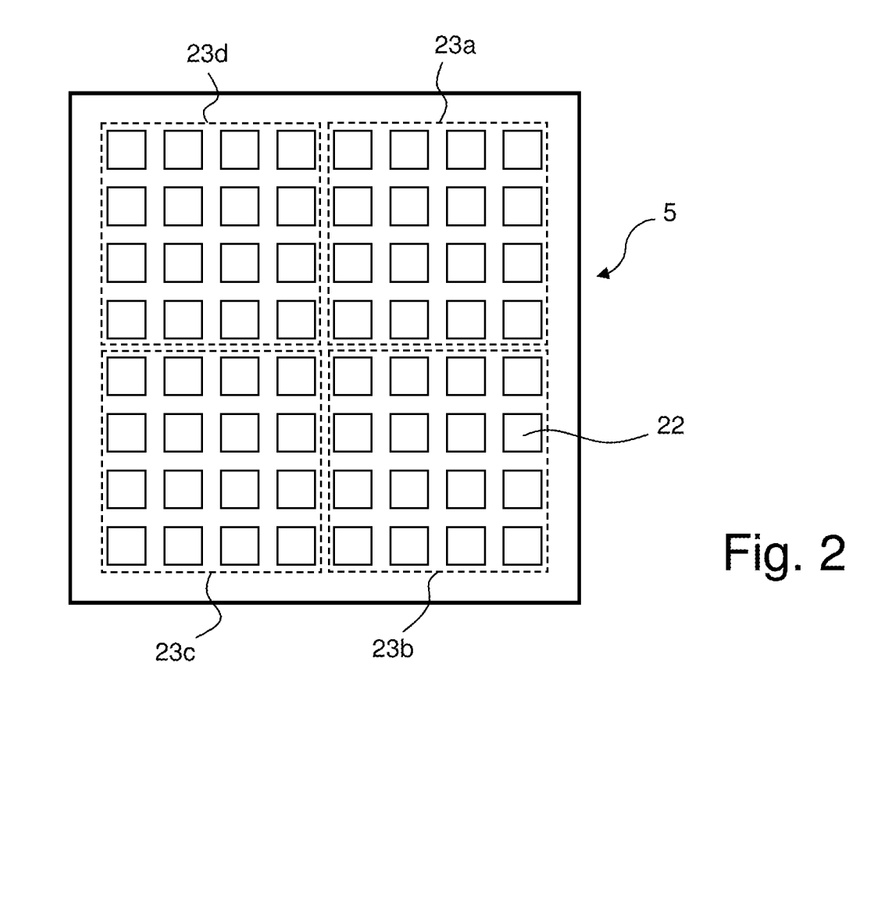
FIG. 2 shows an end view of the array detector of FIG. 1 with sub-arrays according to the invention marked.

FIG. 2 shows in a schematic end view the two-dimensional array detector 5 from FIG. 1. The array-detector 5 here has 64 detector elements (individual detectors) 22 in a square arrangement.

According to the invention four cohesive, rectangular sub-arrays 23a-23d, each with 16 detector elements, have (here) been configured as subsets of detector elements 22 of the array detector 5. The detector elements are each read out in separate passes of the moving reflector 16 over the identical distance IW. In a cohesive sub-array, each detector element of the sub-array can be reached by any other detector element of the sub-array directly via a side or via any number of detector elements of the sub-array adjacent to a side.

It should be noted that alternatively non-cohesive sub-arrays can be formed; a non-cohesive sub-array consists, for example, of the detector elements 22 of the first and fifth lines in FIG. 2.

Figure 3:
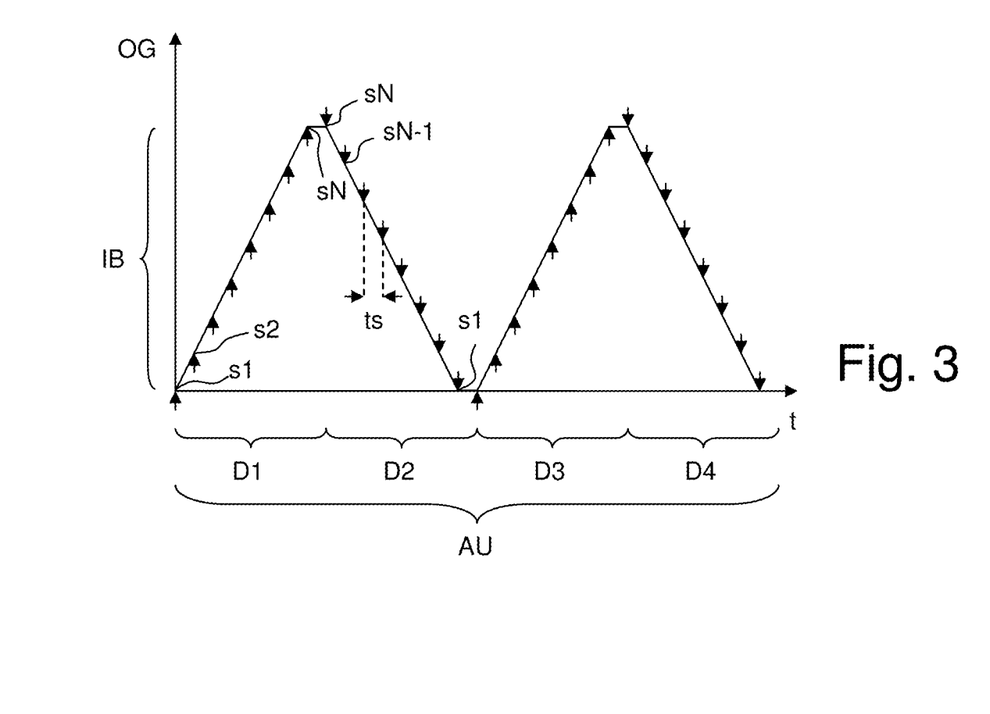
FIG. 3 is a measuring sequence graph of a first variant of the method according to the invention.

FIG. 3 illustrates by way of example the passing of the optical path difference OG over time t of an acquisition AU of a two-dimensional, spatially resolved image in the context of the invention; the acquisition can be effected for example, on the FT spectrometer of FIG. 1.

The acquisition AU comprises here four passes (sweeps) D1 . . . D4 of the optical path difference OG between the partial beams over the identical range IB. In the first pass D1 the optical path difference OG is continuously enlarged, and at each scan point s1 . . . sN a first sub-array (for instance 23a in FIG. 2) is read out. In the second pass D2 the optical path difference OG is continuously reduced, i.e. the scan points are read out in reverse order sN . . . s1 compared to the first pass; a second sub-array (for instance 23b in FIG. 2) is read out each time here. In this case the device for changing the optical path difference need not be spatially reset before the second pass D2. The passes D3 and D4 follow, for which the sign of the change of the optical path difference OG is likewise reversed with respect to the preceding pass each time; in these passes D3, D4, a third sub-array (for instance 23c in FIG. 2) and a fourth sub-array (for instance 23d in FIG. 2) respectively are read out.

The duration ts between two scan points s1 . . . sN is needed primarily to read out the detector elements of the particular sub-array. The inverse of the time ts produces what is known as the sample rate; at a ts of 1 ms the sample rate is, for example, 1 Hz.

Figure 4:
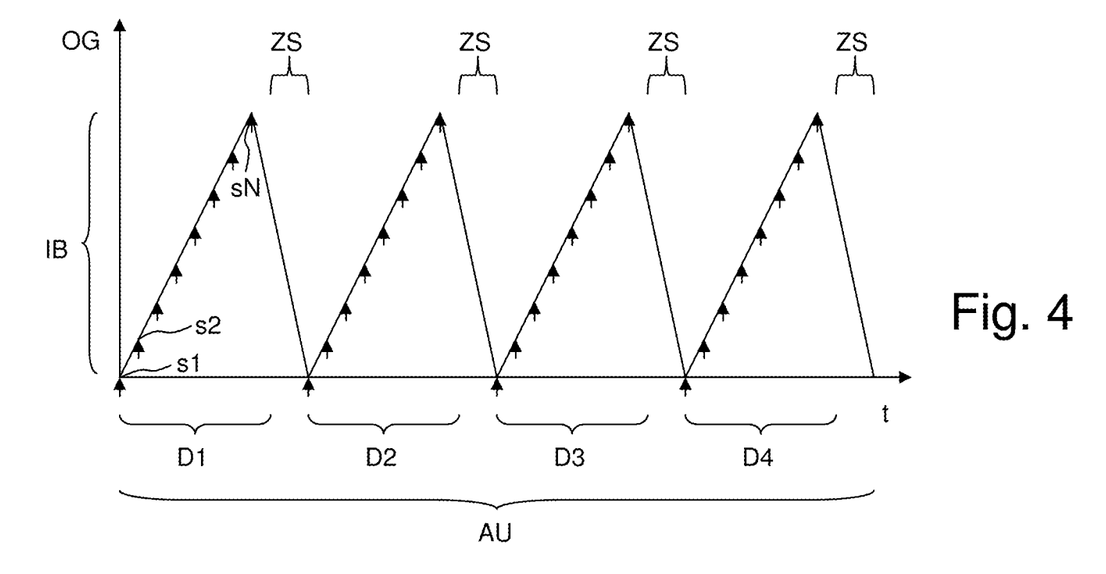
FIG. 4 is a measuring sequence graph of a second variant of the method according to the invention.

FIG. 4 illustrates an alternative sequence of the acquisition AU in a graph similar to that of FIG. 3 (second variant); only the differences will be explained.

In this acquisition, in all passes D1 . . . D4 the optical path difference OG is continuously increased. Between the passes D1 . . . D4, the device for changing the optical path difference is re-set (for instance, by bringing the moving reflector back to the starting point of the pass just completed). During the resetting ZS, the array detector is typically not read out, which may prolong the total duration of the acquisition AU (compared with the procedure of FIG. 3), but somewhat simplifies data acquisition.

Figure 5:
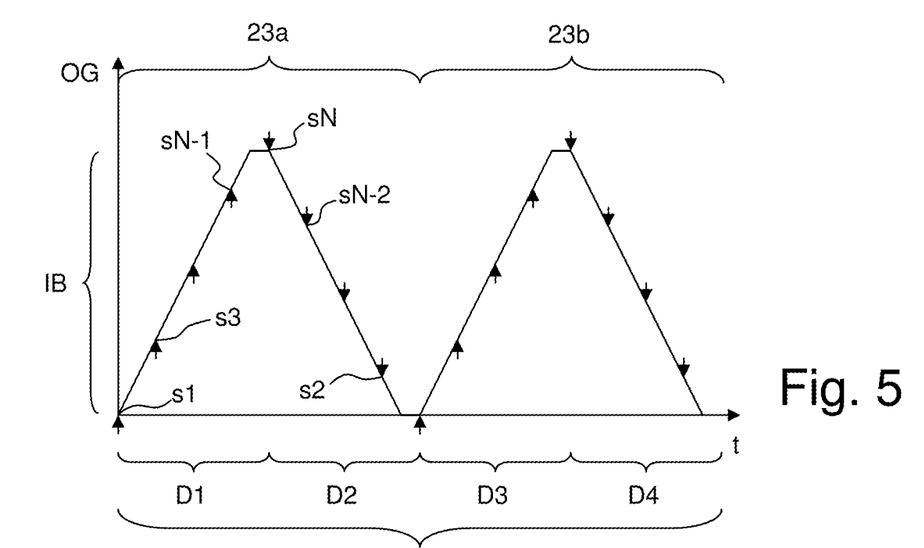
FIG. 5 is a measuring sequence graph of a third variant of the method according to the invention.

FIG. 5 illustrates a third variant for the acquisition AU of a spectrally resolved, two-dimensional image in a graph similar to that of FIG. 3; again, only the differences will be explained.

In this variant, two sub-arrays 23a, 23b in a total of four passes D1 . . . D4 of the optical path difference OG are read out. During the passes D1 and D2 the sub-array 23a is read out, wherein in the first pass D1 only the scan points s1, s3, . . . sN−1 (odd-numbered scan points) are read out, and in the second pass D2 only the scan points sN, sN−2, . . . s2 (even-numbered scan points) are read out. In the two passes D1 and D2 the detector elements of the sub-array 23a are thus read out at different optical path differences. Correspondingly, during the passes D3 and D4 the sub-array 23b is read out, wherein in pass D3 again only the odd-numbered scan points are read out and in pass D4 only the even-numbered scan points.

In this variant, for the acquisition of the spectrally resolved image the signals of two or more passes of the optical path difference are used for each subset (of each sub-array) of detector elements in order to compile a complete set of scan points. As a result, the optical path difference can be changed within the individual passes at especially high speed.

Figure 6:
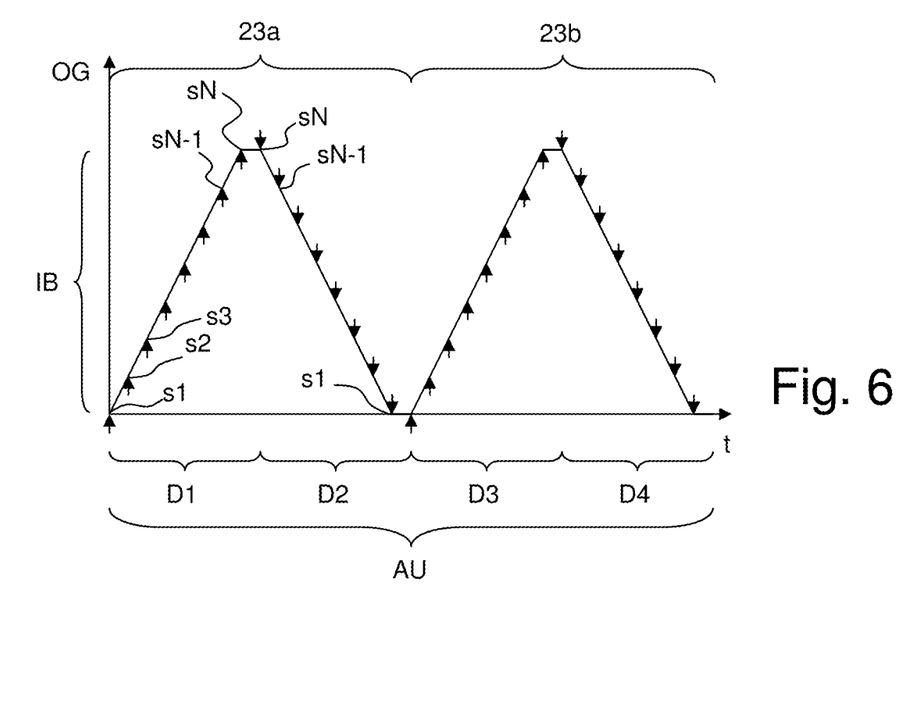
FIG. 6 is a measuring sequence graph of a fourth variant of the method according to the invention.

FIG. 6 illustrates a fourth variant for the acquisition AU of a spectrally resolved, two-dimensional image in a graph similar to that of FIG. 3; again only the differences are explained.

In this variant, two sub-arrays 23a, 23b in a total of four passes D1-D4 of the optical path difference OG are likewise read out. During the passes D1 and D2 the sub-array 23a is read out, wherein in the first pass D1 and in the second pass D2 in each case the same scan points (here all scan points s1 to sN) are read out. The (here) two signals for the same scan points from the two passes D1 and D2 are averaged (for each individual pixel). During the passes D3 and D4 the sub-array 23b is read out, wherein in the third pass D3 and in the fourth pass D4 again in each case the same scan points are read out. The (here two) signals for the same scan points from the two passes D3 and D4 are again averaged (for each individual pixel).

By averaging the signals from multiple passes for each sub-array the influence of measurement noise can be reduced.

It is to be noted that in the case of a measurement of the scan points for a sub-array in multiple passes (see for instance FIGS. 5 and 6), the passes belonging to a sub-array should take place within as short a time as possible (preferably immediately one after the other).

The invention can be used in particular in the field of environmental analysis, for instance to investigate exhaust gas plumes, for example, of factories, machines or vehicles, or for determining surface contaminations; another area of application is chemical engineering, in particular process monitoring.

We claim:

1. A method for acquisition of a spectrally resolved, two-dimensional image by means of Fourier transform (FT) spectroscopy or Fourier transform infrared (FTIR) spectroscopy, the method comprising the steps of:
   a) feeding light to an interferometer, thereby splitting the light into two partial beams;
   b) changing an optical path difference between the two partial beams, thereby traversing an identical range several times;
   c) detecting the light with a two-dimensional array detector;
   d1) reading out a first subset of detector elements of the array detector during at least one first pass of the optical path difference between the two partial beams over the identical range as generated in step b);
   d2) reading out a second subset of detector elements of the array detector during at least one second pass of the optical path difference between the two partial beams over the identical range as generated in step b), wherein the second subset of detector elements differs from the first subset of detector elements and the at least one second pass is executed subsequent to the at least one first pass; and
   e) Fourier transforming and combining signals of read-out detector elements from the first and second subsets and from the at least one first and second passes to form the spectrally resolved image.

2. The method of claim 1, wherein the subsets each form a respective cohesive or rectangular sub-array of detector elements of the array detector.

3. The method of claim 2, wherein the spectrally resolved image is combined using signals from non-overlapping sub-arrays of detector elements of the array detector.

4. The method of claim 1, wherein the optical path difference is changed by means of one or more moving reflectors and the or each moving reflector is moved within the multiple passes over an identical distance.

5. The method of claim 1, wherein, in successive passes, the change in the path difference is effected with an opposite sign.

6. The method of claim 1, wherein the spectrally resolved image is acquired from a scene which does not change noticeably over a duration of one pass, yet does change noticeably over a duration of all passes of the acquisition.

7. The method of claim 1, wherein the spectrally resolved image is combined from signals of at least two subsets of the detector elements from at least two passes and a union of the at least two subsets does not correspond to a quantity of all existing detector elements of the array detector.

8. The method of claim 1, wherein for each of the subsets, the signals of the detector elements of the subset are read out in two or more passes of the optical path difference, wherein the read-out is effected at different optical path differences in the two or more passes.

9. The method of claim 1, wherein, for each of the subsets, the signals of the detector elements of the subset are read out in two or more passes of the optical path difference, wherein an averaging, summation or median calculation of signals that are measured in the two or more passes, at identical optical path differences, is carried out.

10. An FT or FTIR spectrometer, the spectrometer comprising:
   an interferometer having an optical path device for changing an optical path difference between two partial beams of light supplied to said interferometer;
   a two-dimensional array detector;
   an electronic control unit, said electronic control device structured to control said optical path device in order to traverse an identical range of said optical path difference several times, said electronic control unit further structured to read out detector elements of said two-dimensional array detector, wherein said electronic control unit is programmed for acquisition of an individual, spectrally resolved, two-dimensional image in response to multiple passes of optical path difference changes through said identical range, thereby reading out a first subset of detector elements of said array detector during at least one first pass of said optical path difference between said two partial beams over said identical range and reading out a second subset of detector elements of said array detector during at least one second pass of said optical path difference between said two partial beams over said identical range, wherein said second subset of detector elements differs from said first subset of detector elements and said at least one second pass is executed subsequent to said at least one first pass; and
   a computing unit structured to Fourier transform signals read-out from said first and second subsets of detector elements and obtained during said at least one first and second passes, said computing unit also structured to combine said signals into a spectrally resolved image.

11. The FT spectrometer of claim 10, wherein said computing unit is integrated in said electronic control unit.

12. The FT spectrometer of claim 10, wherein said computing unit is separate from said electronic control unit.

13. The FT spectrometer of claim 10, wherein said optical path device comprises a reflector moved by a motor.

14. The FT spectrometer of claim 10, wherein for acquisition of the spectrally resolved image, said electronic control unit is programmed to read out each subset of detector elements in two or more passes of said optical path difference, wherein in said two or more passes, read-out is effected at different optical path differences.

15. The FT spectrometer of claim 10, wherein, for acquisition of the spectrally resolved image, said electronic control unit is programmed to read out each subset in two or more passes of said optical path difference, wherein an averaging, summation or median calculation of signals that are measured in said two or more passes, at identical optical path differences, is carried out.

* * * * *